United States Patent
Rogers et al.

(10) Patent No.: US 7,509,266 B2
(45) Date of Patent: Mar. 24, 2009

(54) INTEGRATED COMMUNICATION SYSTEM AND METHOD

(75) Inventors: William H. Rogers, Newton, MA (US); Eugene C. Nelson, Norwich, VT (US)

(73) Assignee: Quality Data Management Inc., Cleveland, OH (US)

( * ) Notice: Subject to any disclaimer, the term of this patent is extended or adjusted under 35 U.S.C. 154(b) by 1416 days.

(21) Appl. No.: 09/871,420

(22) Filed: May 31, 2001

(65) Prior Publication Data

US 2004/0093257 A1     May 13, 2004

Related U.S. Application Data

(60) Provisional application No. 60/208,364, filed on May 31, 2000.

(51) Int. Cl.
  *G06F 17/30* (2006.01)
(52) U.S. Cl. ........................ 705/10; 379/88.18
(58) Field of Classification Search ............ 705/10; 379/88.18
  See application file for complete search history.

(56) References Cited

U.S. PATENT DOCUMENTS

| | | | |
|---|---|---|---|
| 4,320,256 A | | 3/1982 | Freeman ............... 179/6.04 |
| 4,958,284 A | * | 9/1990 | Bishop et al. ............ 434/353 |
| 5,005,143 A | * | 4/1991 | Altschuler et al. ......... 702/181 |
| 5,309,505 A | * | 5/1994 | Szlam et al. ............ 379/88.01 |
| 5,351,285 A | * | 9/1994 | Katz ..................... 379/93.14 |
| 5,414,754 A | * | 5/1995 | Pugh et al. ............. 379/88.23 |
| 5,517,405 A | * | 5/1996 | McAndrew et al. ........ 706/45 |
| 5,703,935 A | * | 12/1997 | Raissyan et al. ......... 379/88.18 |
| 5,706,441 A | | 1/1998 | Lockwood ............... 395/203 |
| 5,724,379 A | | 3/1998 | Perkins et al. ........... 395/202 |
| 5,764,923 A | | 6/1998 | Tallman et al. ........... 395/203 |
| 5,838,774 A | | 11/1998 | Weisser, Jr. ............. 379/92.02 |
| 5,893,098 A | * | 4/1999 | Peters et al. ............. 707/10 |
| 5,924,073 A | | 7/1999 | Tyuluman et al. ......... 705/2 |
| 5,943,416 A | * | 8/1999 | Gisby ................... 379/265.13 |
| 6,032,177 A | * | 2/2000 | O'Donnell ............... 709/204 |
| 6,064,978 A | | 5/2000 | Gardner et al. .......... 705/10 |

(Continued)

OTHER PUBLICATIONS

Survey—FT Telecoms: Queueing makes callers see red: Think Tank: Recent Telephone research has identified the factors the lead to customer fury. Financial Times, Survey London Edition 1 ED, p. 15. Nov. 19, 1997. (dialog file 476: 9048501).*

(Continued)

*Primary Examiner*—Johnna R. Loftis
(74) *Attorney, Agent, or Firm*—Pearne & Gordon LLP (57) ABSTRACT

An integrated communication system and method for conducting surveys, and more particularly an at least partially automated and efficient system and method for collecting, processing, and displaying customer satisfaction survey information that enables a product or service provider to evaluate the quality of goods and/or services received based on ratings and reports obtained by performing surveys of customers, employees, and/or staff. The system utilizes survey scripts implementing drill-down questioning techniques to gain insights into the survey participants' reasons for their opinions. The system processes the raw survey data into useful survey information, such as graphs and charts, for presenting to consumers (i.e., customers) of the survey who may be remotely located. In this way the system and method can be utilized in a quality improvement program.

27 Claims, 5 Drawing Sheets

U.S. PATENT DOCUMENTS

| | | | | |
|---|---|---|---|---|
| 6,101,241 A * | 8/2000 | Boyce et al. | | 379/88.01 |
| 6,118,865 A * | 9/2000 | Gisby | | 379/265.02 |
| 6,137,870 A * | 10/2000 | Scherer | | 379/127.06 |
| 6,138,139 A * | 10/2000 | Beck et al. | | 709/202 |
| 6,151,581 A | 11/2000 | Kraftson et al. | | 705/3 |
| 6,189,029 B1 * | 2/2001 | Fuerst | | 709/217 |
| 6,337,904 B1 * | 1/2002 | Gisby | | 379/210.01 |
| 6,381,744 B2 * | 4/2002 | Nanos et al. | | 725/24 |
| 6,477,504 B1 * | 11/2002 | Hamlin et al. | | 705/10 |
| 6,631,370 B1 * | 10/2003 | Pekkanen | | 707/4 |
| 6,687,685 B1 * | 2/2004 | Sadeghi et al. | | 706/15 |
| 6,754,676 B2 * | 6/2004 | Dietz et al. | | 707/104.1 |
| 6,807,274 B2 * | 10/2004 | Joseph et al. | | 379/265.01 |

OTHER PUBLICATIONS

Call Centres—Working in real time. Post Magazine, p. 21. Aug. 10, 2000. (from dialog file 20: 12424271).*

* cited by examiner

INTEGRATED COMMUNICATION SYSTEM AND METHOD

BACKGROUND OF THE INVENTION

This application claims the benefit of U.S. Provisional Application Ser. No. 60/208,364, filed May 31, 2000 and incorporated herein by reference.

The present invention relates generally to a system and method for conducting surveys, and more particularly to an at least partially automated and efficient method and system for collecting, processing, and displaying customer satisfaction survey information that enables a product or service provider to evaluate the quality of goods and/or services received based on ratings and reports obtained by performing surveys of customers, employees, and/or staff.

Conventional approaches for surveying consumers of products and services, such as health care services, generally use standard survey forms or questionnaires, whereby an agent calls or visits a survey participant and performs the survey. Alternatively, the participant may be mailed a survey form for completion.

However, these methods of performing surveys are inefficient and often inaccurate. Individual agents are typically used to perform the survey, and to tally and process the results into an assessment as to how well an organization is performing. Although computers are likely to be used to analyze the survey data, human agents are still typically used to enter the data into a computer or to perform the actual survey questioning. Unfortunately, human agents are expensive to hire, increasing survey costs, and humans often make mistakes, leading to survey inaccuracies.

One possible solution involves using computer-operated surveys where the participant uses the touch-tone feature of a telephone to enter replies to questions. However, such a system seems impersonal to the participant, often leads to mistakes if the participant forgets the key/answer mapping, and is limited to the use of touch-tone telephones. Such a solution also does not provide an adequate means to get actual participant verbal responses to questions. Actual recorded verbal responses have the advantage of capturing the participant's subjective tone and emotional state, as well as capturing the participant's objective opinion.

It would be advantageous to automate the survey process to reduce the number of human beings utilized in the survey process, to increase the accuracy, reduce the costs, improve the efficiencies, and overcome the shortcomings of current techniques identified above. Modern computer and networking technology provides potential solutions to these problems. Advances in automated voice recognition, database design, computer processing, and computer networking all provide means to improve the process of performing a survey.

In addition, because all survey participants tend to be asked the same pre-determined list of questions, little insight into the particular reasons behind the answers are typically available. Conventional means of solving this problem may involve having a participant state a reason for their answer. However, the consumer of a survey assessment may only be interested in detailed reasons behind an answer in particular situations, such as when a consumer is very dissatisfied with a service or product, while the same consumer may not care why a survey participant was satisfied with a service or product. Also, processing these stated "reasons" using standard techniques can be difficult, time consuming, and costly. Accordingly, an adaptable survey questioning procedure would be useful, one that determines the depth of questioning on certain topics depending on the answers given to questions on that topic, and that utilizes computer technology to process verbal replies.

Conventional written surveys attempt to solve this process by, for example, telling a participant to "skip section X if you answered 'no' to question Y" or to "complete section Q only if you answered 'poor' to question T". Telephone or personal surveys often require the survey agent to follow similar instructions. This can be confusing and frustrating to participants and agents alike, often leading to errors or incomplete surveys. More sophisticated, automated survey techniques that depend on neither the participant nor agent's understanding of the survey structure would be advantageous.

In summary, better utilization of modern computers, software, and communication technologies while reducing reliance on human agents performing survey questioning would be beneficial to the consumers of survey information and the survey participants, as well as the agents performing the surveys.

SUMMARY OF THE INVENTION

The invention is a system for collecting and presenting survey information made up of a connecting device connected to an external communication system for connecting the external communication system to a survey participant, a CATI unit connected to the connecting device, which transfers the communication connection of the participant to the CATI unit when the connection is successful, and further wherein an agent uses the CATI unit to ask the participant manual survey questions.

The invention also has an IVR unit connected to the CATI unit, wherein the CATI agent transfers the participant's communication connection to the IVR unit for conducting an automated survey, wherein the IVR unit accepts oral responses from the participant. As an alternative, the CATI agent may ask the participant for permission to transfer the participant's communication connection to the IVR unit for an automated survey. If the participant does not give permission for an automated interview, the CATI agent conducts a manual interview. As a further alternative, the IVR unit can be set up to transfer the participant's communication connection back to the CATI unit on a voice command, wherein the CATI agent can continue with a manual survey.

A database is used for storing the participant's responses to the manual survey and/or the automated survey.

A CTI unit may also be a part of the system, wherein the CTI unit is connected to said Connecting device to monitor the status of the device, and further wherein the CTI unit is also connected to the CATI unit to monitor the status of the CATI unit and the agent using the CATI unit; and still further wherein the CTI unit is connected to the IVR unit to monitor the conducting of the automated survey.

DETAILED DESCRIPTION OF THE INVENTION

Figure 1:
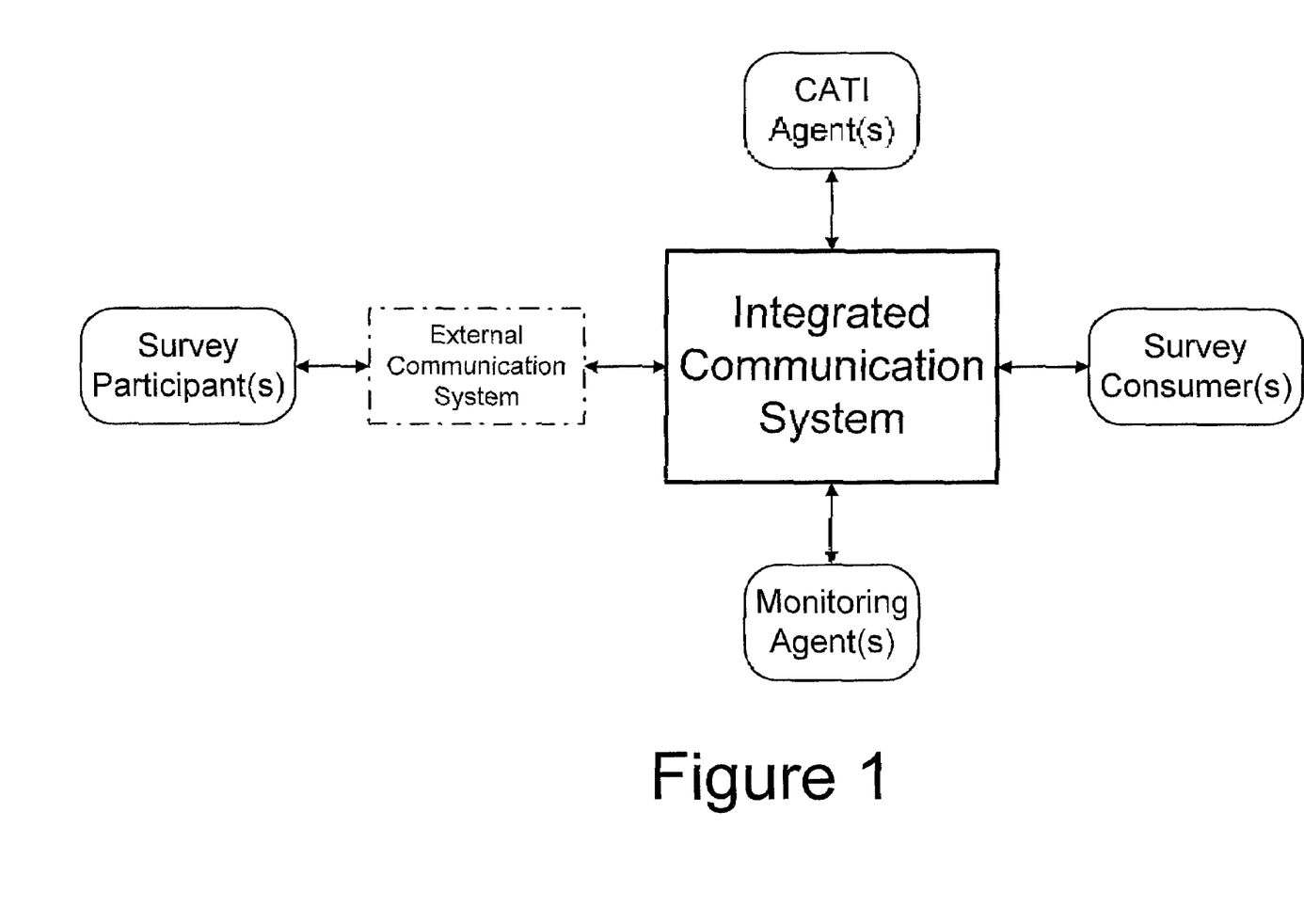
FIG. 1 is a block diagram showing the ICS external interfaces.

FIG. 1 shows a block diagram of the Integrated Communication System (ICS), along with its major interfaces with external entities. The ICS is the system upon which the interactive survey and data management method is implemented. The ICS is a fully integrated data collection, data computation, and data presentation system representing an advanced call center technology infrastructure.

As shown in the figure, the ICS connects to an external communication system, typically a telephone network, although the ICS can utilize other types of communication networks as well, such as the Internet and Internet telephony, private networks, cellular networks, and radio networks, among others.

A survey participant is contacted via the external communication network, such as by calling the participant, and the participant is requested to participate in the survey. Alternatively, the participant might initiate the connection, such as by calling a special phone number.

The ICS interacts with various personnel, such as CATI agents and monitoring agents, who may be considered a part of the system in some implementations. The CATI agents use a Computer-Assisted Telephone Interview (CATI) Unit to help communicate with the participant and perform manual surveys utilizing the ICS system and its methods to provide manual survey activities, when necessary. Monitoring agents can interact with the system in order to evaluate the system, and to evaluate the CATI agent performance. The ultimate user of the developed survey information is a survey consumer (i.e., a potential "customer" of the ICS). The consumer, when his or her identity is verified and validated, has access to survey data and processed survey information generated by the system for his or her use.

Figure 2:
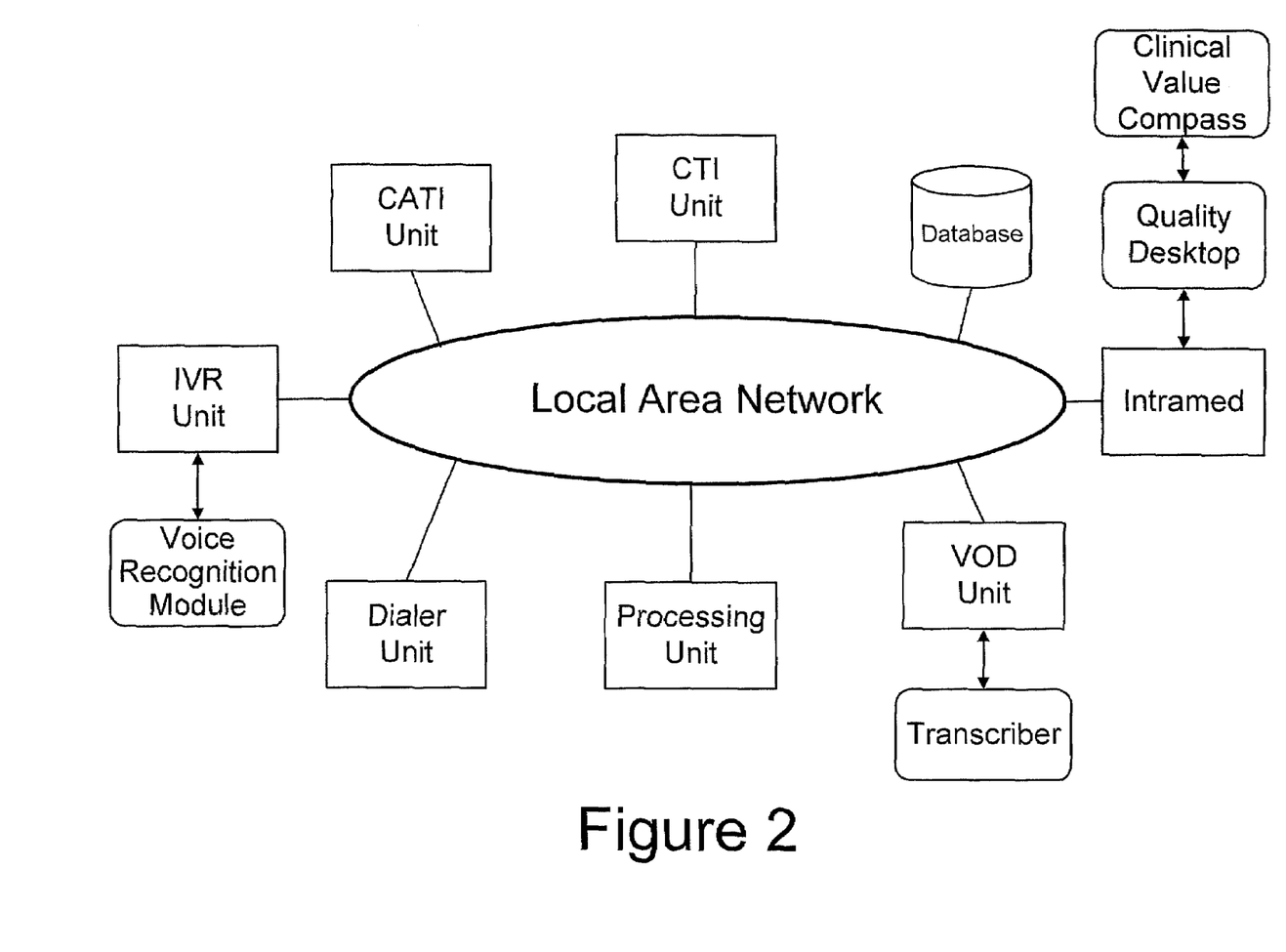
FIG. 2 is a block diagram showing the major ICS components connected to a LAN.

FIG. 2 shows the major components of the ICS. The ICS contains a communication system connecting device, for example, a dialer unit when a telephone system is used as the communication system, for initiating the communication connection with the participant. The ICS also contains the Computer-Assisted Telephone Interview (CATI) unit, which is used by a CATI agent to perform manual surveys; an Interactive Voice Recognition (IVR) unit that can perform automated surveys by interacting orally with the participant, and which utilizes a voice recognition module to interpret participants' responses; a Computer Telephony Interface (CTI) Unit for monitoring the progress of the surveys and the system; a Database for storing data generated by the surveys, the CTI unit, and the ICS system itself; a Voice On Demand (VOD) Unit which utilizes a Transcriber to transcribe and retrieve online stored interviews; an Intramed, which utilizes the Quality Desktop, which in turn utilizes the Clinical Value Compass, to provide remote data access to the consumer of the survey data; and a host Local Area Network (LAN) to connect all of the components together, as shown.

The LAN provides automated database interchange between a consumer's computer and the ICS to collect demographic profiles of members of a survey sample, costs, or clinical and biological outcome data. The connection from the LAN to the consumer computer may be via a Wide Area Network, such as the ubiquitous Internet, to ensure widespread availability of access. The LAN also provides the communication platform for the various ICS components.

Figure 3:
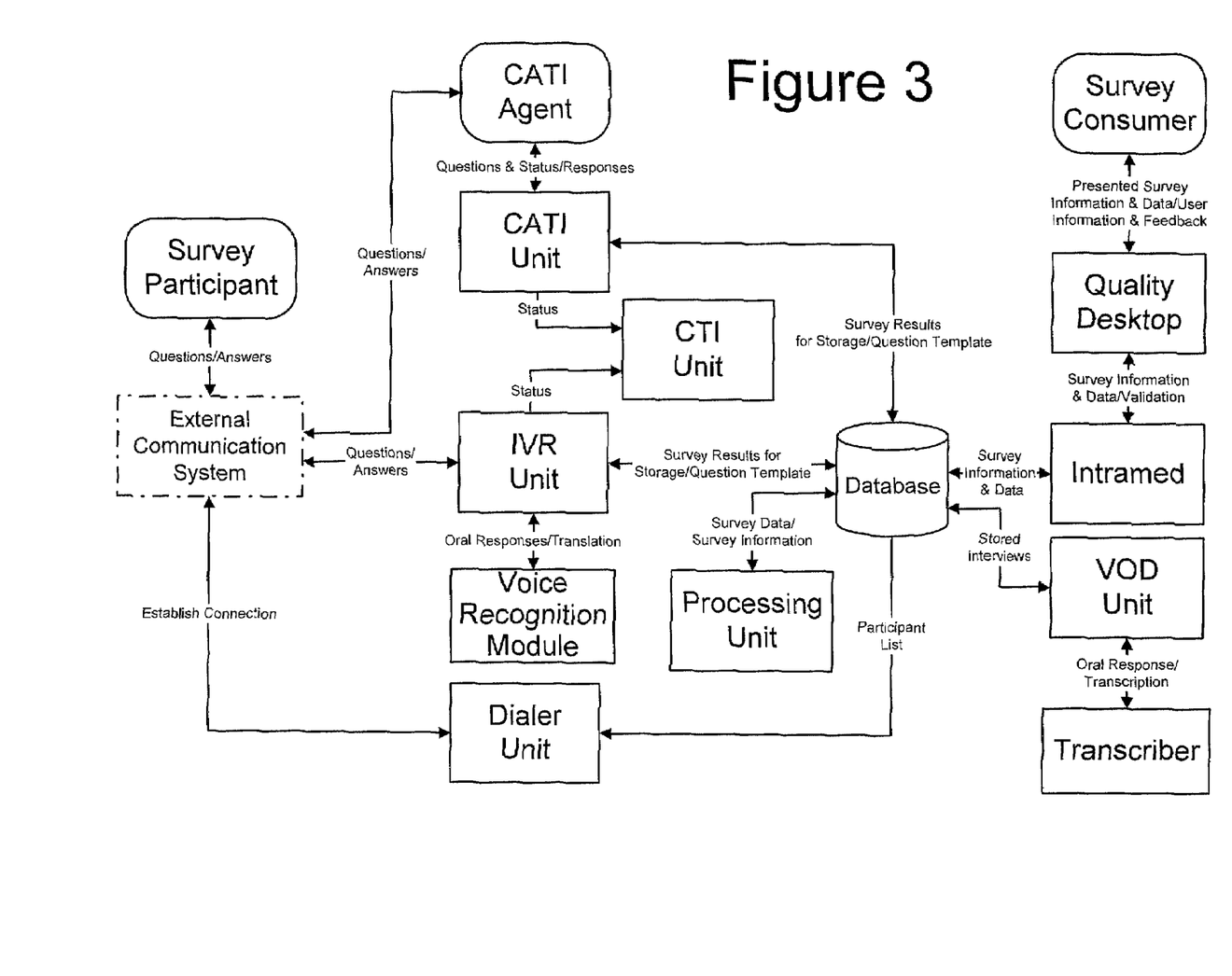
FIG. 3 is a block diagram showing the major ICS components along with the primary data flow between them.

FIG. 3 shows the primary data interchange between the major ICS components, and between the ICS and external entities. The LAN supports this data communication, but it is not shown in the diagram for the sake of simplicity. The Internet, or other external networks, may also support this communication structure, especially communication between the external entities and the ICS LAN, but these networks are also not shown for simplicity.

The Dialer unit is an automated outgoing telephone call connection device that dials a programmed series of respondent telephone numbers (which may be stored in the Database) at scheduled times. The Dialer unit transfers a successfully connected call to the CATI unit, and thus to a CATI agent, when a participant answers. The Dialer unit could be implemented by using a personal computer programmed to perform the dialing functions, or by using a dedicated device designed for this purpose.

The CTI unit monitors the activity of the Dialer unit, and creates a "call record" that follows the routing of each outgoing and incoming call; provides instantaneous "pop screens" to agents for fielding surveys; and provides extensive campaign statistics, such as the number of attempts per respondent, the call duration, and the mode of completion. The CTI unit can also monitor the status of surveys as they are being conducted by the CATI agent and the IVR unit. The CTI unit might be implemented using a personal computer programmed for this purpose. Alternatively, this program could be run on a computer performing other functions as well to maximize the utilization of computing resources.

The CATI agent is a trained call center agent who uses a CATI unit to start surveys by introducing the connected participant to a survey. The CATI unit would most likely be implemented by programming a computer terminal to perform the required functions. Alternatively, the CATI unit program(s) might be multitasked on a computer along with other computer programs, or multiple instances of CATI programs. However, it is likely that each CATI agent will operate his or her own CATI unit to avoid undesirable interactions between various agents and to allow an agent to have complete control of the corresponding CATI unit. The CATI unit can utilize "pop-screens" to provide information to the CATI agent, while the CATI agent can enter information into the CATI unit using a mouse and/or keyboard. The ICS allows for multiple CATI agents each operating their own CATI unit to perform a plurality of simultaneous (or staggered) survey interviews with many different participants. This capability increases the efficiencies of the system.

Figure 4:
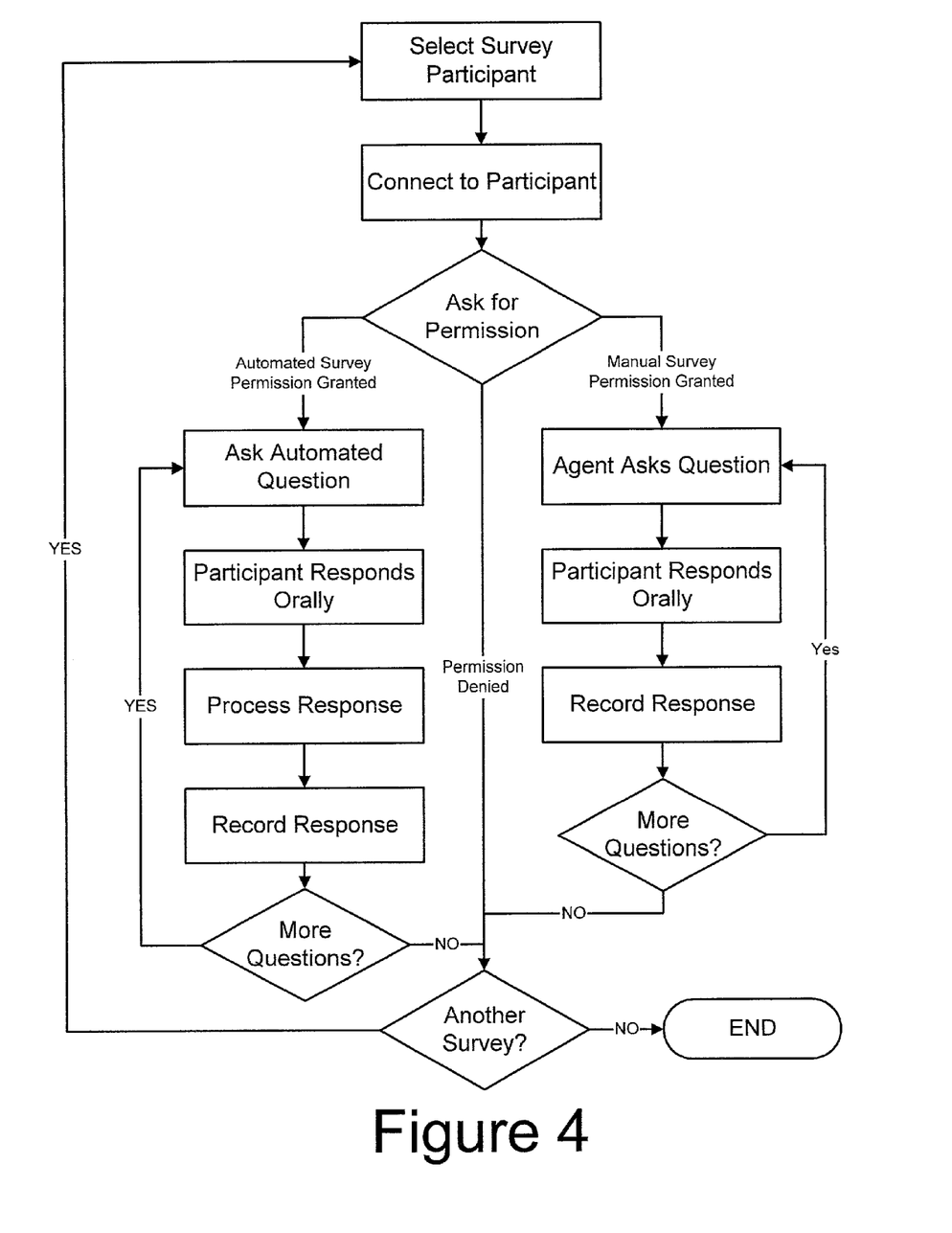
FIG. 4 is a flow chart describing the high-level survey process with a survey participant.

The flow chart of FIG. 4 shows the high-level sequence of events that occurs after a participant has been connected to the system. After the Dialer unit has successfully connected a selected participant, the CATI agent asks the participant for permission to conduct a survey. If the participant agrees, the CATI agent then requests permission to allow the IVR unit to conduct an automated survey. If the participant again agrees, the participant is connected to an IVR unit, which performs an automated survey.

If the participant agrees to participate in the survey but refuses to be transferred to the IVR unit, the CATI agent will manually conduct the survey using the CATI unit. Although it is preferable to conduct as many surveys as possible using the IVR unit from a cost and efficiency perspective, CATI agents conducting manual interviews are useful to increase the total number of participants involved in a survey, since not all participants are willing to participate using an automated system, and thus the use of CATI agents tends to increase the total sample size of the resulting survey collection.

The CATI agent may be responsible for recording or transcribing the participant's responses to the survey questions using the CATI unit keyboard, or, preferably, the CATI agent may select a response from a pre-determined list, such as through the use of a mouse and/or keyboard. Alternatively, the CATI unit might utilize voice recognition technology to automatically transcribe and record the participants' responses, perhaps allowing the CATI agent to monitor the result and make corrections when necessary. The CATI agent can also transfer the participant back to an agent during an IVR interview if necessary.

The CATI unit of the invention differs from other types of "CATI" programming in that it is network-scheduled and controlled, and it is fully integrated with IVR interviews so that interviews can be handed transparently from one environment to the other. This feature is made possible by using an integrated script programming language, for example.

The IVR unit is a computer device on which survey scripts can be deployed. The IVR unit asks questions of the participant using synthesized or recorded speech, and it receives answers orally from the participant. The unit breaks down incoming speech into phrases and responses and hands them off to the voice recognition module, to interpret oral responses by the participant. Since speech recognition is used by the IVR unit, touch-tone functions are typically not necessary. To increase the accuracy of the voice recognition function, the suggested responses to survey questions are carefully chosen in order to improve the ability of the voice recognition module to interpret the responses. The IVR unit collects the participant responses, consults with a script to decide what to say in response, and then causes that response to be spoken to the other party or parties on the phone. In addition, it manages a telephone trunk line, including dialing outbound calls and answering inbound calls. It conferences and un-conferences human agents. It can record pieces of incoming speech or whole conversations.

The IVR unit may be able to handle multiple instances of automated interviews with a number of different participants, thus increasing the efficiencies of the IVR function. Multiple IVR units could thus handle large numbers of participants simultaneously.

At any time, the participant participating in an IVR automated survey may transfer the survey back to a CATI agent by voice command, such as by asking for "Help" or some similar trigger word(s) or phrase(s). The CATI agent can then answer any questions the participant might have, and the agent can continue the same survey interview at the point where the IVR unit left off. In this way, participants are not left "stranded" with the automated unit, making it less likely that the participant will terminate the survey prematurely and thus making completion of surveys more likely.

A manual CATI agent survey follows the same question pattern as one that is performed by the IVR unit. Both follow survey scripts with a pre-determined question format that utilize drill-down questioning (described hereinbelow) and the surveys also utilize verbatims (audio recordings of actual answers—also described hereinbelow). The survey responses provided by the participant to either the IVR unit or the CATI agent are stored in the Database for later analysis and retrieval.

A Scheduler program (not shown) could be used for allocating resources in the networked environment. This program helps organize resources, deciding how to match needs for human agents against a pool of available agents, and causing the IVR unit program to undertake this. It also includes synchronizing agent terminals and the IVR unit when transferring between automated telephonic, internet-based, and agent communication, so that the participants in the survey are transferred seamlessly in each direction. This program also makes short-term decisions about whom to dial, and maintains records of the results of conversations for other programs in the system.

The survey responses from various participants stored in the database contain raw survey data, which must be processed in order to be converted into survey information useful to survey consumers. The Processing Unit represents this processing of raw survey data into useful survey information. This unit could be implemented using a computer with off-the-shelf statistical processing software, or by running a customized program on a personal computer. Some processing may need to be done manually, such as the transcription of verbatims into text. However, as voice recognition technology improves, automated transcription may also be utilized.

The actual processing required may depend on the needs of the ultimate consumer of the survey information. Normalized summaries and comparisons between various units and departments, product or service quality measurements, normalized response times, and information about specific products, services, employees, or departments, can all be obtained as desired.

For example, in the medical field, where the invention is expected to provide immediate utility, useful information that can be obtained from processing raw survey data includes:
  (A) generating consumer satisfaction measures such as:
    (i) consumer loyalty measures;
    (ii) medical care satisfaction measures;
    (iii) medical facility satisfaction measures;
    (iv) medical staff satisfaction measures;
    (v) positive comments with reasons; and
    (vi) negative comments with reasons;
  (B) generating staff rating measures such as:
    (i) staff loyalty measures;
    (ii) staff performance measures;
    (iii) staff satisfaction measures; and
    (iv) staff continuing education measures;
  (C) generating doctor rating measures comprising:
    (i) quality of medical care measures;
    (ii) doctor performance measures;
    (ii) doctor satisfaction measures;
    (iii) doctor loyalty measures; and
    (iv) doctor continuing education measures;
  (D) generating care delivery measures such as:
    (i) cost measures including:
      (a) cost of medical care paid by consumer measures;
      (b) cost of medical care paid by non-consumer measures;
      (c) cost of providing medical care measures; and
      (d) overhead costs measures; and
    (ii) profit measures;
  (E) generating medical care quality assessment measures such as:
    (i) mortality measures
    (ii) morbidity measures;
    (iii) complications measures;
    (iv) medical procedure results measures;
    (iv) medical procedure follow-up measures;
    (vi) patient mental health measures;
    (vii) social impact measures;
    (viii) hospital stay length measures;
    (ix) HEDIS® technical quality measures; and
    (x) PM PM cost measures;
  (F) analyzing the generated measures and survey data, such as:
    (i) aggregating survey data to form assessments;
    (ii) normalizing comparisons between specific named units including:
      (a) doctors or specialists;
      (b) medical care organizations or divisions;
      (c) staff persons;

(d) managers;
(e) specific medical treatments; and
(f) patient group status;
(iii) determining changes over time;
(iv) determining differences geographically; and
(v) generating summaries.

The resulting survey information can then be formatted for display in graphical, textual, or even full-motion video, as appropriate for the type of information being examined and displayed. Charts and graphs of various types and textual reports can all be generated from this information, when desirable. The ICS may include interactive features to allow the consumer to manipulate the data source, display format, or survey being shown. In addition, the system could provide information in audio format, such as by playing the actual participant verbatims as originally recorded.

A VOD unit could contain millions of surveys interviewed by CATI agents or IVR units that are stored in a database for easy retrieval and transcription of participant free-text comments (i.e., verbatims) and ratings. VOD is also used to evaluate agent performance in fielding interviews and performing CATI surveys, and for ongoing evaluation of speech recognition patterns.

An Intramed unit provides the consumer with remote access to data, often within 24 hours of its collection across a Virtual Private Network (VPN), which can be used to keep all data off the public Internet (unless encrypted) and ensure privacy and security. This unit authenticates the consumer end user, encrypts and de-encrypts data transferred to the desktop workstation on which the outcome measurements presentation operates and where all archival and dynamic data is stored. The VPN keeps all data off the public internet and ensures privacy and security. Alternatively, system access can be provided to the consumer by using standard Internet security programs and tools, such as by using web browsers with ID and password verification, or by using encryption and/or security certificates to verify users and ensure that data integrity and privacy is preserved.

The consumer computer could have the Quality Desktop installed to connect to Intramed. The Quality Desktop uses the Clinical Value Compass to provide survey information in a useful and properly formatted display. Alternatively, the Quality Desktop could be run remotely on a server, with the user computer displaying the information using a client program such as a web browser or similar display tool. In that case, no specialized software need be installed on the consumer computer.

Figure 5:
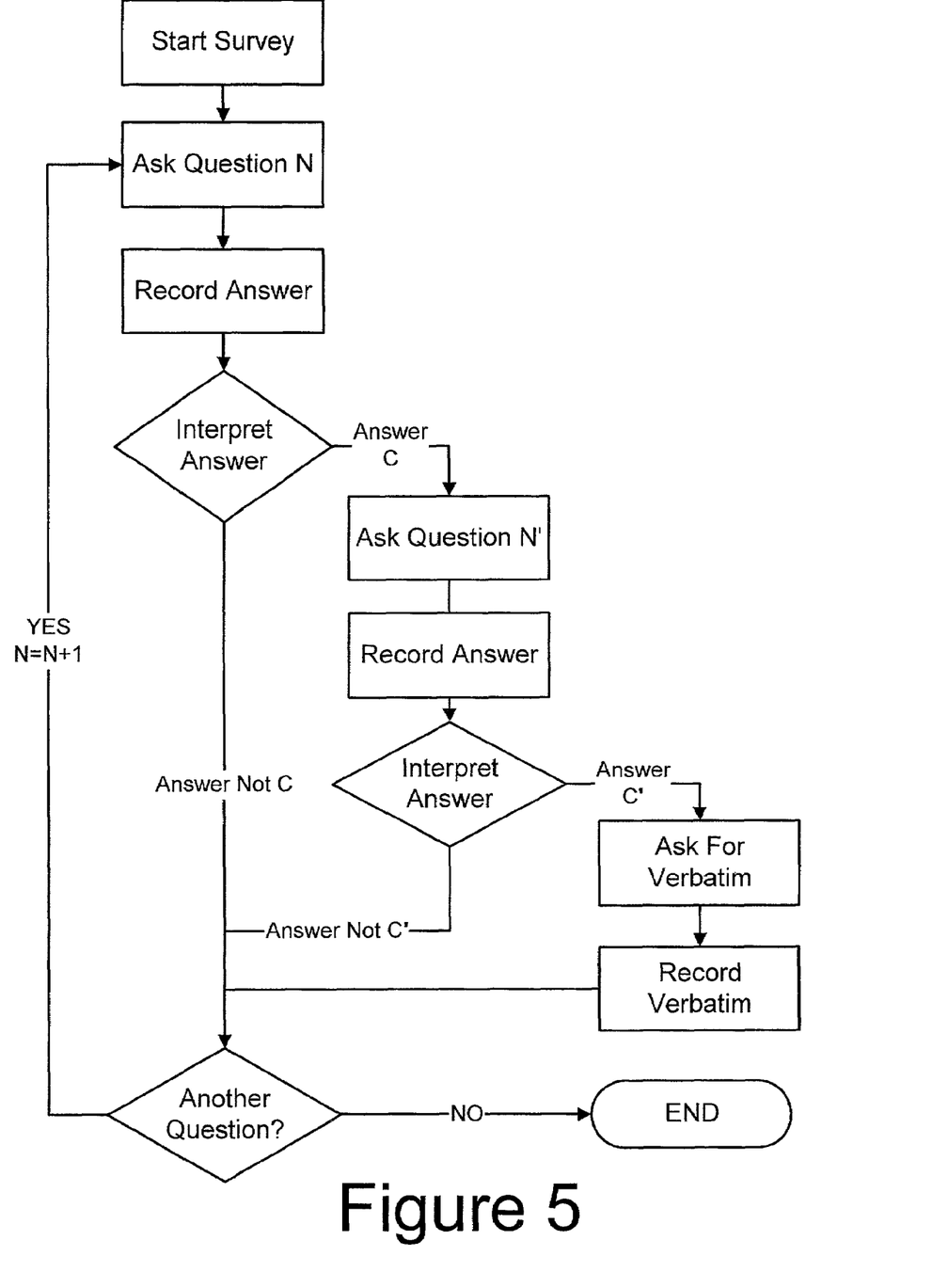
FIG. 5 is a flow chart providing an example of the drill-down questioning technique.

FIG. 5 is a flow chart showing a simple example of the interactive survey script approach, wherein focus or drill down surveys containing "drill-down" questions, and open-ended questions called "verbatims", are deployed by the survey. The questions are pre-determined, but this survey format allows the questioning to "drill-down" into greater detailed questions when certain specific responses are given. As shown in FIG. 5, it may be that answers A and B of question N are of sufficient detail for survey analysis, such that no additional questioning on that specific topic is necessary, while answer "C" requires specific follow-up questioning (i.e., N') to get greater detail on the reasons for the answer "C", for example. Thus, only if the participant answers "C" to question N is question N' asked next. If the participant answers C' to question N', then the participant could be asked to leave a detailed "verbatim" response to explain his or her answer, while answers A' and B' to question N' might require no verbatim. The survey can then go on to the next normal question, N+1.

Using these "drill-down" question techniques, the survey can be "customized" according to the actual responses of the participant. Multiple variations and levels of drill-down questioning are possible, depending on the purpose of the survey. This capability allows a survey to gather greater detail in those subject areas where a survey consumer might want greater detail, while conserving resources by only asking for that detail when appropriate. The drill-down format could go quite deep into a subject area before requiring a verbatim, or it may only go down a layer or two as shown in FIG. 5. Drill-down questioning is discussed in co-pending application INTERACTIVE SURVEY AND DATA MANAGEMENT METHOD AND APPARATUS, Nelson et al., incorporated herein by reference. This application is also related to provisional applications serial Nos. 60/245,753 and 60/245,769, incorporated herein by reference.

As an example in how to utilize the system in a quality improvement program, survey information consumers might want to review their organization's data in an area where a standard survey, implemented by the ICS or some traditional alternative, had identified some performance deficiencies. Focus surveys can be designed and implemented to collect the necessary raw data from the organization's customers and/or staff. The raw survey data is processed, formatted, and made available to the appropriate persons via the ICS, providing useful information and conclusions so that the management of the organization is in a position to better understand the cause of the deficiency and make the proper corrections, thereby improving the quality of goods and/or services and the performance of the organization.

After making changes (to correct the deficiency), focus surveys can be designed and/or performed again to measure the impact of the changes and perhaps fine-tune the results.

Finally, the ratings obtained in an ongoing standard survey should reflect the performance and quality improvement resulting from the changes. The focus surveys are then suspended, and the quality improvement program has successfully implemented the ICS, leading to marked improvements in quality.

The invention has been described hereinabove using specific examples; however, it will be understood by those skilled in the art that various alternatives may be used and equivalents may be substituted for elements or steps described herein, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

The invention claimed is:

1. An integrated survey system comprising:
   a connection device connected to an external communication system for connecting said communication system to a survey participant;
   a database for storing responses to survey questions;
   a Computer-Assisted Telephone Interview (CATI)unit connected to said connection device, wherein said connection device is adapted to transfer the participant communication connection to said CATI unit when said connection to the survey participant is successful, and wherein
   said CATI unit is adapted for use by the agent for communicating with the participant, and further wherein
   said CATI unit is adapted for presenting a survey to said CATI agent for allowing the agent to present said survey to the participant using said CATI unit, and wherein participant responses to said survey are used to generate data for storing in said database;

an Interactive Voice Recognition (IVR) unit connected to said CATI unit, wherein said CATI unit is adapted for permitting said agent to transfer the participant's communication connection to said IVR unit for conducting said survey in an automated manner, wherein said IVR unit accepts oral responses from the participant for generating data stored in said database, and wherein said IVR unit is further adapted to terminate the automated survey at any point and transfer the participants communication connection back to said CATI unit upon voice command by the participant, and further wherein said system is adapted such that said CATI unit presents said survey to said agent from the point of termination by said IVR unit so that the agent continues said survey in a manual manner.

2. The system for collecting and presenting survey information of claim 1, further comprising: a Computer Telephony Interface (CTI) unit, wherein said CTI unit is connected to said connection device to monitor the status of said connection device, and further wherein said CTI unit is connected to said CATI unit to monitor the status of said CATI unit and said agent using said CATI unit; and still further wherein said CTI unit is connected to said IVR unit to monitor said conducting of said automated survey.

3. The system for collecting and presenting survey information of claim 1, wherein said survey includes a drill-down survey technique, wherein a following survey question depends on the answer to a previous question.

4. The system for collecting and presenting survey information of claim 1, wherein said system is adapted for accepting includes the use of a verbatim response to a survey question, wherein the participant can orally communicate detailed opinions to said IVR unit or said CATI agent, respectively, and further wherein said verbatim is stored in said database.

5. The system for collecting and presenting survey information of claim 4, further comprising: a processing unit for converting data stored in said database into survey information; and a presenting unit for presenting said survey information to a consumer.

6. The system for collecting and presenting survey information of claim 5, wherein said survey information is derived from a plurality of surveys derived from a plurality of participants, and further wherein said system presents said survey information to said consumer over a computer network, and still further wherein said consumer must be validated before said system will allow the consumer to access said survey information.

7. The system for collecting and presenting survey information of claim 6, wherein said survey information is available for presenting to said consumer within 24 hours of the completion of the conducting of said plurality of surveys.

8. The system of claim 1, wherein, when the automated survey is being conducted, said IVR unit is adapted to receive a response from the participant that causes the CATI agent to transfer the survey back to the agent or another agent.

9. The system of claim 1 further comprising a processing unit for processing said responses stored in said database into useful survey information for presentation to a user.

10. A process for collecting and presenting survey information comprising the steps of:
(I) selecting a participant from a list of potential participants;
(II) connecting the participant to a survey communication system;
(III) inquiring whether the participant is willing to accept a transfer to an automated survey;
(IV) transferring the participant's communication system connection to an automated survey unit only if the participant assents to said transfer;
(V) conducting a survey interview, wherein said conducting is performed by said automated survey unit if the participant assented to said transfer, but said conducting is performed manually if the participant does not assent, and further wherein an automated survey unit accepts oral responses from the participant, said oral responses being processed using voice recognition into survey data;
(VI) if said user is undergoing an automated survey, manually continuing said survey from the current point forward upon a voice request of the user to stop said automated survey; and
(VII) saving said survey interview in a database.

11. The process of collecting and presenting survey information as in claim 10, wherein said conducting of said survey interview is performed by providing survey questions to participant using a pre-determined survey procedure utilizing drill-down questioning, wherein a following survey question depends on the answer to a previous question.

12. The process of collecting and presenting survey information as in claim 11, further comprising the steps of:
(VIII) processing said survey data into survey information;
(IX) saving said survey information in a database; and
(X) presenting said survey information to a consumer.

13. The process of collecting and presenting survey information as in claim 10, wherein said transferring of the participant's communication system connection to said automated survey unit occurs by action of an agent using a terminal only if said survey participant agrees to said transfer, and further wherein said survey interview is conducted manually by an agent if the participant does not agree to said transfer.

14. The process of collecting and presenting survey information as in claim 13, wherein said conducting of said survey interview is performed by providing survey questions to the participant using a pre-determined survey question procedure utilizing drill-down questioning for said conducting of both manual and automated surveys, wherein a following survey question depends on the answer to a previous question.

15. The process of collecting and presenting survey information as in claim 13, wherein said agent can transfer the participant back to said automated survey unit to continue said survey interview, and further wherein the participant participating in an automated survey can be transferred to said agent by a voice command from the participant.

16. The process of collecting and presenting survey information as in claim 15, wherein said conducting of said survey interview is performed by providing survey questions to the participant using a pre-determined survey question procedure utilizing drill-down questioning for said conducting of both manual and automated surveys, wherein a following survey question depends on the answer to a previous question.

17. The process of collecting and presenting survey information as in claim 16, further comprising the steps of:
(VIII) processing said survey data into survey information;
(IX) saving said survey information in a database;
(X) presenting said survey information to a consumer.

18. The process of collecting and presenting survey information as in claim 13, further comprising the steps of:
(VIII) processing said survey data into survey information;
(IX) saving said survey information in a database;
(X) presenting said survey information to a consumer.

19. A process for collecting and presenting survey information comprising the steps of:
- (I) selecting a participant from a list of potential participants;
- (II) connecting the participant to a survey communication system;
- (III) transferring the participant's communication system connection to an automated survey unit if said survey participant agrees to said transfer, wherein the participant participating in an automated survey can be transferred to said agent by a voice command from the participant such that said agent continues with said survey, and further,
  wherein a survey interview is conducted manually by an agent if the participant does not agree to said transfer,
  wherein said conducting of said survey interview is performed by providing survey questions to participant using a pre-determined survey procedure utilizing drill-down questioning, wherein a following survey question depends on the answer to a previous question;
- (IV) conducting said survey interview, wherein said conducting is performed by said automated survey unit or manually, and further wherein said automated survey unit accepts oral responses from the participant, said oral responses being processed using voice recognition into survey data;
- (V) saving said survey interview in a database;
- (VI) processing said survey data into survey information;
- (VII) saving said survey information in a database; and
- (VIII) presenting said survey information to a consumer, wherein said presenting is available within 24 hours of said conducting of said survey.

20. A process for collecting and presenting survey information as in claim 19, wherein the participant is selected from a group of doctors, medical staff, medical patients, a family member of a medical patient, and a medical care employer; and further wherein the participant gave or received services from said medical care provider.

21. A process for collecting and presenting survey information comprising the steps of:
- (I) collecting survey data, said collecting comprising the steps of
  - (A) selecting a participant from a list of potential participants, wherein said selecting is done according to specified schedules;
  - (B) connecting the participant to a survey communication system, said connecting comprising the steps of:
    - (i) attempting to connect with the participant via said survey communication system, said attempting including the steps of:
    - (ii) requesting that the participant agree to communicate with an Interactive Voice Recognition (IVR) unit for a survey interview; and
    - (iii) collecting call record information, wherein said call record information is stored in a database; and
  - (C) conducting said survey interview, wherein said conducting is performed by said IVR unit if the participant agreed to communicate with said IVR unit, and further wherein said conducting is performed by a Computer-Assisted Telephone Interview (CATI) agent if the participant did not agree to communicate with said IVR unit, said conducting of said survey interview comprising the steps of:
    - (i) asking survey questions of participant using a pre-determined survey question procedure utilizing drill-down questioning, wherein said survey questions provide sufficient survey data to allow for the creation of survey information; and further wherein survey responses by participant are done orally, and still further wherein said survey data optionally includes voice interviews;
    - (ii) saving said survey data in said database, wherein said saving includes voice recognition processing of said oral responses of the participant if said conducting of survey interview is performed by said IVR unit, wherein said voice recognition occurs at approximately real-time, and further wherein the voice recognition processed response is used to determine a next survey question;
    - (iii) transferring said communication system connection to a CATI unit if the participant requests such a transfer while the IVR unit is conducting said survey interview, wherein said CATI agent uses said CATI unit to continue said conducting a survey interview;
    - (iv) transferring said communication system connection to a CATI unit when said survey question procedure requires such a transfer, wherein said CATI agent then conducts said survey interview using said CATI unit, and further wherein said CATI agent can transfer said communication system connection back to said IVR unit to continue said survey interview;
    - (v) monitoring said survey question procedure status, wherein said status information can be made available for display;
    - (vi) terminating said conducting a survey interview when said pre-determined survey question procedure is complete or when the participant requests such termination.

22. A process for collecting and presenting survey information as in claim 21, further comprising the steps of:
- (I) processing said survey data, wherein said processing converts said survey data collected from a plurality of participants into survey information, said processing comprising the steps of:
  - (A) generating consumer satisfaction measures;
  - (B) generating employee rating measures;
  - (C) generating employer or organization rating measures;
  - (D) generating quality assessment measures; and
  - (E) analyzing said generated measures and survey data; and
  - (F) storing said survey information in said database;
- (II) providing a survey information consumer said survey information, said providing further comprising the steps of:
  - (A) connecting a survey information consumer computer to a presenting system, wherein said connecting is over a computer network, said connecting comprising the steps of:
    - (i) logging the consumer's computer into the system, wherein the consumer identity is verified; and
    - (iv) preventing the consumer not verified from accessing said medical survey information;
  - (B) presenting said survey information to said consumers, said presenting comprising the steps of:
    - (i) providing said consumers with options for viewing aggregates of said survey information;
    - (ii) providing said consumers with options for viewing summaries of said survey information;
    - (iii) providing said consumers with options for viewing a subset of said survey information;

(iii) providing said consumers with options for viewing said survey data; and
(iv) formatting said presented information for presenting by said consumer computer, wherein said presenting can be graphical, auditory, and textual;
(C) customizing said presented information to the particular needs or access privileges of the consumer, wherein some consumers may have access to a subset of medical information; and
(D) allowing the user to log off said system; and
(III) evaluating said process for collecting and presenting survey information, said evaluating comprising:
(A) evaluating the performance of said CATI agents; and
(B) evaluating the performance of said voice recognition processing.

23. A process for collecting and presenting medical survey information for a medical care provider comprising the steps of:
(I) collecting survey data, said collecting comprising the steps of
(A) selecting a participant from a list of potential participants, wherein said selecting is done according to specified schedules;
(B) connecting the participant to a survey communication system, said connecting comprising the steps of:
(i) attempting to connect with the participant via said survey communication system, said attempting including the steps of:
(a) initiating a survey communication system connection;
(b) transferring said connection to a CATI unit if said connection is successful, wherein if said connection is not successful, selecting a new participant to be the participant;
(c) requesting that the participant agree to participate in a survey, wherein said requesting is performed by said CATI agent using said CATI unit;
(d) requesting recall information from the participant if the participant has not agreed to participate in said survey, wherein said requesting is performed by said CATI agent, and further wherein said recall information includes a request to connect again at a different time or using a different communication system; and
(e) terminating said connection after said requesting of recall information if the participant has not agreed to participate in said survey;
(ii) requesting that the participant agree to communicate with an IVR unit for a survey interview; and
(iii) collecting call record information comprising:
(a) overall connection attempts;
(b) connection attempts for each of the participants contacted; and
(c) connection durations;
wherein said call record information is stored in a database; and
(C) conducting said survey interview, wherein said conducting is performed by said IVR unit if the participant agreed to communicate with said IVR unit, and further wherein said conducting is performed by said CATI agent if participant did not agree to communicate with said IVR unit, said conducting said survey interview comprising the steps of:

(i) asking survey questions of participant using a pre-determined survey question procedure utilizing drill-down questioning, wherein said survey questions provide sufficient survey data to allow for the creation of medical survey information; and further wherein survey responses by participant are done orally, and still further wherein said survey data optionally includes voice interviews;
(ii) saving said survey data in said database, wherein said saving includes voice recognition processing of said oral responses of the participant if said conducting of survey interview is performed by said IVR unit, wherein said voice recognition occurs at approximately real-time, and further wherein the voice recognition processed response is used to determine a next survey question;
(iii) transferring said communication system connection to a CATI unit if the participant requests such a transfer while the IVR unit is conducting said survey interview, wherein said CATI agent uses said CATI unit to continue said conducting a survey interview;
(iv) transferring said communication system connection to a CATI unit when said survey question procedure requires such a transfer, wherein said CATI agent then conducts said survey interview participant are done orally, and still further wherein said survey data optionally includes voice interviews;
(ii) saving said survey data in said database, wherein said saving includes voice recognition processing of said oral responses of the participant if said conducting of survey interview is performed by said IVR unit, wherein said voice recognition occurs at approximately real-time, and further wherein the voice recognition processed response is used to determine a next survey question;
(iii) transferring said communication system connection to a CATI unit if the participant requests such a using said CATI unit, and further wherein said CATI agent can transfer said communication system connection back to said IVR unit to continue said survey interview;
(v) monitoring said survey question procedure status, wherein said status information can be made available for display;
(vi) terminating said conducting a survey interview when said pre-determined survey question procedure is complete or when the participant requests such termination;
(II) processing said survey data, wherein said processing converts said survey data collected from a plurality of participants into medical survey information, said processing comprising the steps of:
(A) generating consumer satisfaction measures comprising:
(i) consumer loyalty measures;
(ii) medical care satisfaction measures;
(iii) medical facility satisfaction measures;
(iv) medical staff satisfaction measures;
(v) positive comments with reasons; and
(vi) negative comments with reasons;
(B) generating staff rating measures comprising:
(i) staff loyalty measures;
(ii) staff performance measures;
(iii) staff satisfaction measures; and
(iv) staff continuing education measures;

(C) generating doctor rating measures comprising:
   (i) quality of medical care measures;
   (ii) doctor performance measures;
   (ii) doctor satisfaction measures;
   (iii) doctor loyalty measures; and
   (iv) doctor continuing education measures;
(D) generating care delivery measures comprising:
   (i) cost measures including:
      (a) cost of medical care paid by consumer measures;
      (b) cost of medical care paid by non-consumer measures;
      (c) cost of providing medical care measures; and
      (d) overhead costs measures; and
   (ii) profit measures;
(E) generating medical care quality assessment measures comprising:
   (i) mortality measures
   (ii) morbidity measures;
   (iii) complications measures;
   (iv) medical procedure results measures;
   (iv) medical procedure follow-up measures;
   (vi) patient mental health measures;
   (vii) social impact measures;
   (viii) hospital stay length measures;
   (ix) technical quality measures; and
   (x) per member per month (PM PM) cost measures;
(F) analyzing said generated measures and survey data, said analyzing comprising the steps of:
   (i) aggregating survey data to form assessments;
   (ii) normalizing comparisons between specific named units, said named units including:
      (a) doctors or specialists;
      (b) medical care organizations or divisions;
      (c) staff persons;
      (d) managers;
      (e) specific medical treatments; and
      (f) patient group status;
   (iii) determining changes over time;
   (iv) determining differences geographically; and
   (v) generating summaries; and
(G) storing said medical survey information in said database;
(III) providing a medical survey information consumer said medical survey information, said providing further comprising the steps of:
   (A) connecting a medical survey information consumer computer to a presenting system, wherein said connecting is over a computer network, said connecting comprising the steps of:
      (i) logging in the consumer computer to the system, said login comprising the steps of:
         (a) processing a consumer login request, said login request comprising the steps of:
            (1) providing said consumer with a login prompt;
            (2) accepting a consumer login input, said login input comprising:
               a user ID; and
               a user password; and
         (b) processing the consumer login input, said processing comprising the steps of:
            comparing said user ID against a verified consumer list, wherein if said user ID is verified, then:
            verifying said user password by comparing said password to a stored password corresponding to said user ID, if said user password is verified then:
            permitting consumer access to the system; and
            preventing the consumer not logged in from accessing said medical survey information;
   (B) presenting said medical survey information to said consumers, said presenting comprising the steps of:
      (i) providing said consumers with options for viewing aggregates of said medical survey information;
      (ii) providing said consumers with options for viewing summaries of said medical survey information;
      (iii) providing said consumers with options for viewing a subset of said medical survey information;
      (iii) providing said consumers with options for viewing said medical survey data; and
      (iv) formatting said presented information for presenting by said consumer computer, said presenting including:
         graphical display;
         auditory presentment; and
         textual display;
   (C) customizing said presented information to the particular needs or access privileges of the consumer, wherein some consumers may have access to a subset of medical information; and
   (D) allowing the user to log off said system; and
(IV) evaluating said process for collecting and presenting medical survey information, said evaluating comprising:
   (A) evaluating the performance of said CATI agents; and
   (B) evaluating the performance of said voice recognition processing.

24. A system for collecting and presenting survey information from a plurality of participants, said system comprising:
a connection device connected to an external communication system for connecting said communication system to the survey participants;
a Computer-Assisted Telephone Interview (CATI) unit connected to said connection device, wherein, for each one of the participants, said CATI unit provides a corresponding one of a plurality of agents using said CATI unit with a set of manual survey questions for asking said one of the participants, said survey questions including a question requesting permission for performing an automated survey;
an Interactive Voice Recognition (IVR) unit, connected to said CATI unit, adapted to transfer said one of the participants' communication connection to said IVR unit only if said IVR unit is notified that said one of the participants agrees to participate in an automated survey, wherein said IVR unit then accepts oral responses from said one of participant, wherein
for any of the participants who did not agree to participate in said automated survey, said CATI unit being adapted to provide a manual survey by providing survey questions to each one of the agents corresponding to those participants who did not agree for proving a manual survey using substantially the same questions from said automated survey to receive the oral responses, wherein the system is adapted such that, upon request of any participant undergoing an automated survey, said system transfers said requesting participant to the CATI unit to continue said survey in a manual manner; and
a database for storing said responses to said manual surveys and/or said automated surveys.

25. The system of claim 24, wherein the survey includes a drill-down survey technique utilizing one or both of responses already provided by the current survey participant and historical responses provided by other participants to determine a subsequent survey question to be asked of the current survey participant.

26. The system of claim 25, wherein, when the automated surveys are being conducted, said IVR unit is adapted to receive a response from any of the participants that causes the CATI agent to transfer those surveys receiving said response back to one of the agents.

27. The system of claim 25 further comprising a processing unit for processing said responses stored in said database into useful survey information for presentation to a user.

* * * * *